US006855881B2

(12) United States Patent
Khoshnood

(10) Patent No.: US 6,855,881 B2
(45) Date of Patent: Feb. 15, 2005

(54) COMBINED COMMUNICATION AND POWER CABLE WITH AIR COOLING FOR NETWORK SYSTEMS

(76) Inventor: Bahman Khoshnood, 454 NE. 7th St., Boca Raton, FL (US) 33432

( * ) Notice: Subject to any disclaimer, the term of this patent is extended or adjusted under 35 U.S.C. 154(b) by 37 days.

(21) Appl. No.: 10/180,659

(22) Filed: Jun. 26, 2002

(65) Prior Publication Data

US 2004/0000816 A1 Jan. 1, 2004

(51) Int. Cl.[7] .................................................. H01B 9/06
(52) U.S. Cl. ....................... 174/15.1; 307/154; 379/90.1
(58) Field of Search ............................ 174/120 R, 15.1; 379/90.1, 397; 307/154

(56) References Cited

U.S. PATENT DOCUMENTS 6,114,632 A  *  9/2000  Planas et al. ............ 174/117 R
6,608,264 B1 *  8/2003  Fouladpour .............. 200/51.03

FOREIGN PATENT DOCUMENTS

DE      10013864 A1 * 10/2001   ......... H01R/13/641
JP      11154570 A  *  6/1999   ........... H01R/23/02

* cited by examiner

*Primary Examiner*—Shawn Riley
(74) *Attorney, Agent, or Firm*—John C. Smith

(57) ABSTRACT

A multifunction power/data distribution system which consists of a cable system that provides power, data, and air cooling from a single wall outlet. Each device, has a single cable which brings power, data, and/or cooled air to that device. The system includes an appliance coupler assembly which may incorporate a fiber optics signal line, a coax cable, a cooled air supply line, and/or a telephone line. The data lines may be combined into a single high bandwidth line. Only a single cable is required to be run between the appliance coupler socket on the wall and an appliance, such as a PC, telephone, etc., to connect the appliance to an external power source, to a data network, to telephone network, or to a source of air cooling. The system provides for, and describes several types of, mating wall sockets and appliance end plugs.

22 Claims, 13 Drawing Sheets

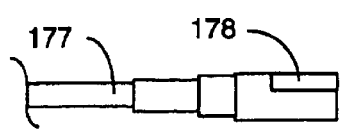
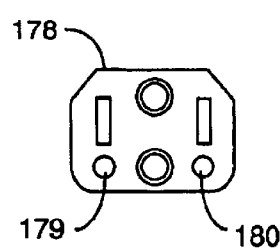
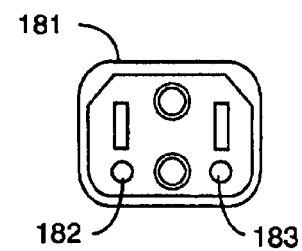
Figure 12A
Figure 12B
Figure 12C
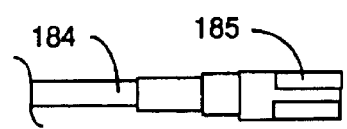
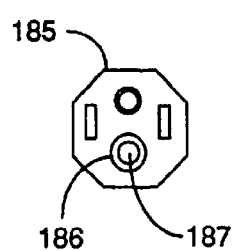
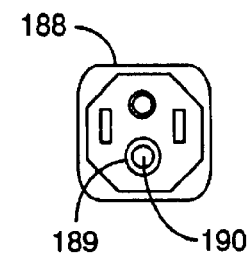
Figure 13A
Figure 13B
Figure 13C
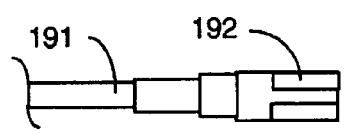
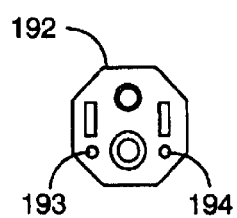
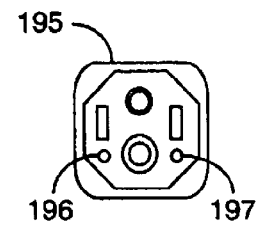
Figure 14A
Figure 14B
Figure 14C

COMBINED COMMUNICATION AND POWER CABLE WITH AIR COOLING FOR NETWORK SYSTEMS

CROSS-REFERENCE TO RELATED APPLICATIONS

This application is a divisional application and continuation-in-part of the commonly owned copending provisional application entitled "Apparatus and method for distributing data and cooled air to electronic equipment via electronic device power cord/plug assemblies with mating wall outlets which incorporate integral signal and/or cooling air supply lines", filed Jun. 27, 2001, bearing U.S. Ser. No. 60/301,374 and naming Bahman Khoshnood, the named inventor herein, as sole inventor, the contents of which is specifically incorporated by reference herein in its entirety.

BACKGROUND OF THE INVENTION

1. Technical Field

The present invention relates to power, data, and controlled temperature air distribution systems. In particular, it relates to a power, data cabling and controlled temperature air system in which a single cable is used to provide power, data, and controlled temperature air flow through the power wall receptacle. The data lines, controlled temperature air conduits, and power lines inside a building wall are made available at the output power sockets of the building wall, and wherein corresponding power cables used to provide power to appliances also have mating data connectors and cables and/or mating controlled temperature air conduits to allow a single cord attached to an output power socket in the building to also connect an appliance, such as a computer, to a data network and/or supply of controlled temperature air.

2. Background Art

With the proliferation of high-tech electronic equipment in both the home and business environments, particularly in regards to computers and peripherals, the quantity of lines and cables feeding this equipment inevitably leads to cable clutter. Various means of cable interconnection management by mechanical means have been devised. There are no known cable assemblies that combine both power, signal line and controlled temperature air into a multi-source outlet.

Conventional cabling systems have become so complex that it is also increased the level of skill required to connect system components together. It would be desirable to have a system with a high-level of connectivity which required a low-level of skill to connect.

While addressing the basic need of providing data paths for computers and other devices, the prior art has failed to provide a simple method of cabling which allows a single line to be run that provides not only power, but power lines combined with data and temperature controlled air lines which are combined into a single cable, which are easy to manufacture, easy to install, and have a minimum number of connections.

SUMMARY OF THE INVENTION

The present invention solves the foregoing problems, and greatly increases the ease of a connecting the components of a computer system, or any other electronics system. It provides a single cable which can be used to connect various devices of a system by merely plugging a power cable into a power outlet. The power outlet connection provides the conventional power lines, and in addition, one or more data lines which may be computer data, telephone data, television data, security data, video data, etc. All of the data lines may be combined into a single high bandwidth line. In addition, a line supplying controlled temperature air is also provided which makes available a temperature controlled air flow for use by heat sensitive devices such as a computer's integrated circuits. Alternative embodiments include the use of a controlled temperature air conduit that can also supply heated or cooled air to suit a particular application, or can extract air from an electronic machine to draw ambient air into it. The air extraction embodiment also allows the air in individual locations in a facility to be remotely monitored for a variety of reasons (e.g., contamination monitoring, etc.). One example of how air extraction can benefit a monitoring system is to measure the temperature of air in different rooms of a building. This technique will allow fire fighters to determine the hot spots in a building and the probable location of the fire.

By providing a single integrated power/data cable which eliminates the need for separate cords for power, for data signal lines, or telephone lines, and for air conduits for providing controlled temperature air to an electronic appliance such as a PC, and by combining the power line with the data network, telephone, and temperature controlled air lines inputs into a common cord assembly, the invention greatly simplifies the interconnection of computers with external power and data sources. In addition, it provides supplemental temperature controlled air for computers which generate more and more heat as they become more powerful, and may even eliminate the need for cooling fans in computers by providing for a temperature controlled air supply line within the power cord assembly. An alternative embodiment that extracts air from the electronic device can also be used to cool an electronic device such as a computer because it draws cooler ambient air into the computer as the heated air inside is extracted. Likewise, the air extraction mechanism can be used to draw air from various locations in a building for remote monitoring.

A modified wall receptacle is also disclosed which combines both power and signal outputs, and/or controlled temperature air flow, into one socket. Thus, computer power, data network, modem line, and controlled temperature air connections can be made simultaneously in one operation, resulting in quicker and simpler set-ups and reducing the number of cords which typically clutter computer installations. In addition, computer noise, and cost, is reduced by elimination or reduced use of cooling fans and heat sinks.

The invention provides several preferred embodiments. The embodiments include power cords which, along with standard power and earth ground leads, include one or more data signal (such as a fiber optic or cable modem line which can be used to access external sources of data such as the Internet or to other computers which may be attached by switches, routers, local area networks (LANs) or telephone line, and/or air supply lines; power plugs molded to the cords which provide the interconnects unique to each cord configuration; wall receptacles which correspond to each unique plug and cord; appliance couplers molded to the opposite ends of the cords with interconnect unique to each cord; and appliance-mounted plugs with interconnects unique to each appliance for mating with the corresponding power cord assembly. The system is capable of operating with any suitable power supply, including AC or DC power sources. In addition peripheral I/O devices, such as printers are also interconnected in this manner. One embodiment routes data signal lines inside of the ground lug used by conventional power plugs. This allows both conventional plugs and the plugs provided by this invention to use the power/data receptacles provided herein.

BRIEF DESCRIPTION OF THE DRAWINGS

FIG. 12A is a side view of a preferred embodiment of a cable for an appliance coupler for a computer which carries AC power, earth ground, forced temperature controlled air and three fiber optics signals.

FIG. 12B is an end view of a preferred embodiment of a cable for an appliance coupler for a computer which carries AC power, earth ground, forced temperature controlled air and three fiber optics signals.

FIG. 12C is an end view of a preferred embodiment of an appliance coupler for use with a computer cable which carries AC power, earth ground, forced temperature controlled air and three fiber optics signals.

FIG. 13A is a side view of a preferred embodiment of a cable for an appliance coupler for a computer which carries AC power, earth ground, forced temperature controlled air and a co-ax signal line.

FIG. 13B is an end view of a preferred embodiment of a cable for an appliance coupler for a computer which carries AC power, earth ground, forced temperature controlled air and a co-ax signal line.

FIG. 13C is an end view of a preferred embodiment of an appliance coupler for use with a computer cable which carries AC power, earth ground, forced temperature controlled air and a co-ax signal line.

FIG. 14A is a side view of a preferred embodiment of a cable for an appliance coupler for a computer which carries AC power, earth ground, airflow, coax connection and two fiber optics signal connections.

FIG. 14B is an end view of a preferred embodiment of a cable for an appliance coupler for a computer which carries AC power, earth ground, airflow, coax connection and two fiber optics signal connections.

FIG. 14C is an end view of a preferred embodiment of an appliance coupler for use with a computer cable which carries AC power, earth ground, airflow, coax connection and two fiber optics signal connections.

DESCRIPTION OF THE PREFERRED EMBODIMENT

Figure 1A:
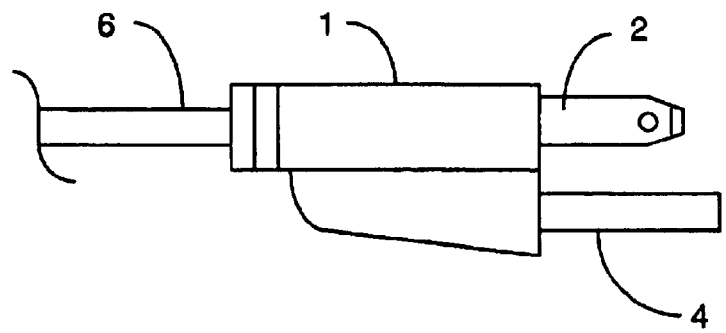
FIG. 1A is a side view of the a preferred embodiment of a power plug with an integral signal lead.

Prior to a detailed discussion of the figures, a general overview of the system will be presented. Cables for supplying power to computers are usually not hardwired into the computers, as is the case with most other common electrical appliances. Computer power cables are, instead, connected via devices commonly known as appliance couplers. Each coupler consists of a socket attached to the end of the power cable which mates with a plug mounted on the back of the computer. Various signal lines to and from the computers and peripheral equipment are attached by means of other types of connectors. Since this invention discloses a method for combining power and signal lines into one common cable and terminating them together at a wall outlet at one end, and an appliance coupler at the other end, to do away with cable clutter and simplify computer set-ups, new types of connectors, routers and switches are required. For ease of discussion, the term "Router" as used with this invention, is intended to mean any type of controller, switching unit, router, hub, or other device that is capable of combining external inputs which may be power, data, and/or air flow, and distributing them to selected locations in a facility using wall outlets. The wall outlets, in turn allow a variety of devices to be connected via a single cable, thereby simplifying installation and reducing cable clutter.

As systems become more complex, and as the variety and number of devices which interconnect increases, the cabling problem also increases. The primary advantage provided by this invention is that it greatly reduces cabling problems by providing a single cable for each device which only has to attach to wall outlet. The paragraphs that follow disclose a variety of different types of appliance couplers which combine power, temperature controlled air and data signal lines together for use with both computers, computer peripherals, and other devices. As a result of this invention, complexity and clutter associated with the cabling of prior art computer, electronic devices, and cooling systems has been eliminated.

In the following figures, a number of embodiments of cable connectors are illustrated to show that there are many design options. Of course, those skilled in the art will recognize that the most effective way to use this invention is to select a standard design which can be used on machines anywhere, in much the same way that conventional AC power plugs have been standardized. For ease of discussion, power lines are discussed below in terms of currently available 120 VAC power lines. However, it is understood that this invention can use any type of power lines, including AC or DC. In addition, any suitable voltage level or AC frequency (e.g., the 50 Hz AC frequency and/or 220 VAC available in Europe, or low voltage AC/DC applications) may be used.

A principal advantage achieved by this system is the ease of connectivity with which system components can be interconnected. The use of the single cable which runs from the power outlet to a particular device eliminates the requirement for any skill on the part of a particular user when connecting the devices. In addition, it is envisioned that this system will incorporate a variety of other features which will further enhance its ease of use. For example, when computer equipment is attached to the wall outlet, the type of software typically referred to as "plug and play" software can be used to identify individual computers, computer peripherals, or other intelligent devices such as PBXs, televisions, cable boxes, etc. This type of software will eliminate the need for an individual to do anything other than merely plug in a particular device.

In this section a detailed description is given of a unique plug and receptacle combination which incorporates a fiber optics signal line interface along with conventional power and earth ground connections. In this case, the fiber optics connector is mounted coaxially within the earth ground connector. This is followed by a description of a variety of different plug, cord and receptacle designs that are covered by this disclosure. Next is a description of many different appliance couplers and mating appliance plugs covered by this disclosure. Finally there is a description of different wiring and networking schemes for buildings and electronic equipment that can be designed to utilize the various types of devices disclosed herein.

Another advantage of the temperature controlled air system is that instead of moving air from the wall receptacle to the electronic device, it can instead be used as a monitoring system. For example, air can be extracted from an electronic device and exhausted through the wall receptacle. This will cause the ambient air in the room to enter the electronic device and cool it. Likewise, ambient air can be extracted from the room for mintoring purposes. This can be useful in areas such as hospitals, manufacturing facilities, etc., where air quality can pose health risks. Once extracted, the air can be remotely monitored and tested.

Figure 1B:
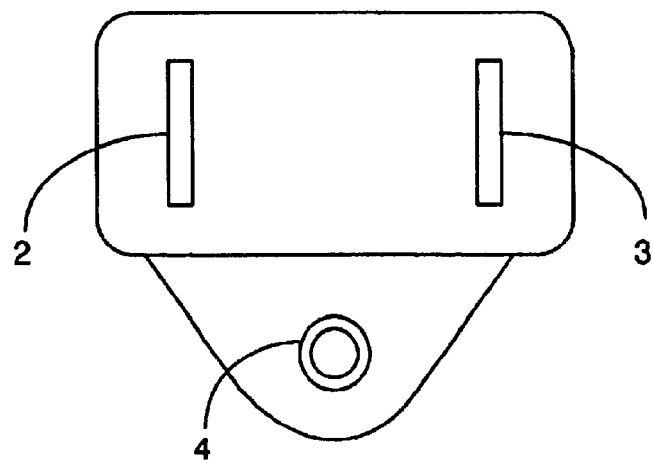
FIG. 1B is an end view of the a preferred embodiment of a power plug with an integral signal lead.
Figure 1C:
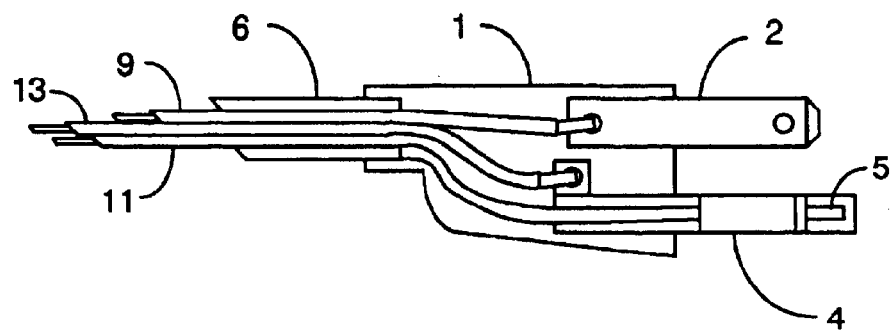
FIG. 1C is a side cutaway view of the a preferred embodiment of a power plug with an integral signal lead.

An appliance power plug is described which incorporates a 120 VAC power connector, earth ground connector, and a fiber optic signal connector all in one assembly. Referring to FIGS. 1A–C, a side view of the plug is shown in FIG. 1A, an end view of the plug is shown in FIG. 1B, and an enlarged sectional view of the plug is shown in FIG. 1C. The plug assembly consists of a molded plastic or rubber body 1, having an appearance substantially as shown in FIGS. 1A–C; two molded-in power prongs 2 and 3 for (+) and (−) voltage inputs, compatible with a conventional 120-volt, alternating current power source; an earth ground connecting prong 4 which is tubular in cross-section; a fiber optics connector 5 which is mounted coaxially within the body of the ground connector 4; and a cord assembly 6 molded to the plug body 1, consisting of an insulating jacket 7, enclosing insulated (+) and (−) power leads 8 and 9, earth ground lead 10, and fiber optics signal line 11. The only difference in the outward physical appearance of the plug assembly disclosed herein and a conventional 3-pronged grounded plug is that the earth ground lug 4 of the disclosed plug is substantially longer.

Figure 2A:
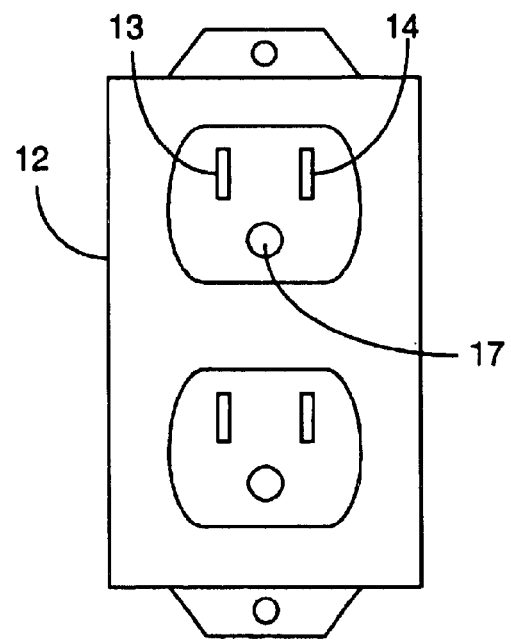
FIG. 2A is a front view of a preferred embodiment of a power receptacle with an integral signal lead.
Figure 2B:
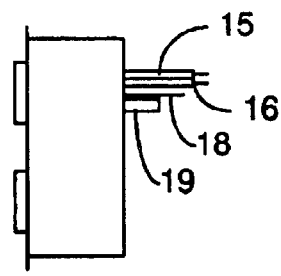
FIG. 2B is a side view of a preferred embodiment of a power receptacle with an integral signal lead.
Figure 2C:
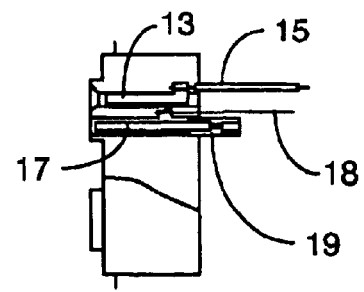
FIG. 2C is a side cutaway view of a preferred embodiment of a power receptacle with an integral signal lead.

A power receptacle is described herein which is designed to mate with the plug assembly described above, but may also be used for mating with a standard configuration, three-pronged grounded plug. Referring to FIGS. 2A–C, the receptacle is shown in front view in FIG. 2A, shown in side view in FIG. 2B, and shown in enlarged sectional side view in FIG. 2C. As seen in the front view of FIG. 2A, the receptacle 12 described herein has the same appearance and physical characteristics as a conventional double-socket wall outlet. Slots 13 and 14 provide an interface for blades 2 and 3 of the plug (shown in FIGS. 1A–C) and connect the plug with the positive 15 and negative 16 voltages at a 120 VAC power source. The round hole 17 provides the interface for the ground prong 4 of the plug 1 (FIGS. 1A–C) and provides grounding for the plug via ground wire 18. In the rear of the receptacle is an additional connector 19 mounted coaxially with the earth ground connector 15. This connector 19 is designed to accept a fiber optics line connector. This feature distinguishes the receptacle disclosed herein from a conventional receptacle. It will be shown in subsequent figures that when the plug assembly disclosed herein is mated with the receptacle assembly disclosed herein, in addition to the connection made between a power source and earth ground, a fiber optic signal connection is made simultaneously. It will further be shown that there is nothing to prevent the mating of a conventional 3-pronged plug with the disclosed receptacle where no fiber optics signal line connection is needed.

Installation of the receptacle 12 is similar to the installation of a conventional wall socket except for the additional installation of the fiber optics signal connection. Just as the AC power and earth ground terminals of the receptacle are connected to the pre-installed building wiring.

In the preferred embodiment, electrical power is provided to individual receptacle wiring boxes, and it is assumed that data lines (fiber optic, cable, etc.) are similarly pre-installed and provided to at least some preselected, if not all of, the receptacle wiring boxes.

Figure 3:
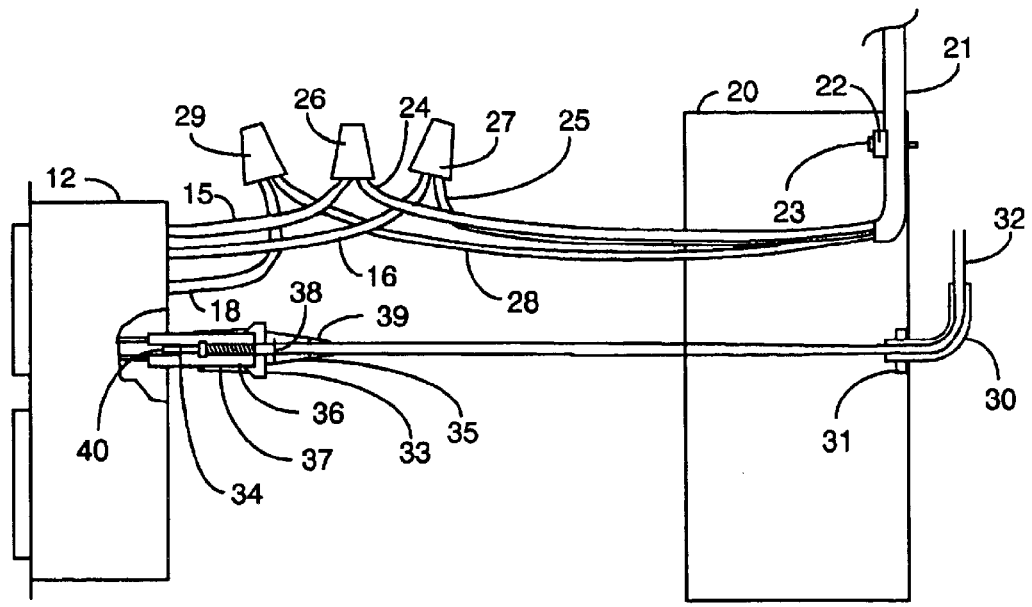
FIG. 3 is a side cutaway view of a preferred embodiment of a wall receptacle with power and data cables installed.

Referring to FIG. 3, the receptacle 12 is shown in side view being installed into a typical electrical box 20, mounted in any one of number of industry standard methods for supplying power to a wall socket. Actual mounting of the box is not shown for ease of illustration. The box is supplied by conventional building wiring cable 21, secured to box 20 by clamp 22 and screw 23 in conventional fashion, power leads 15 and 16 from the receptacle 12 are shown connected to the power source leads 24 and 25, respectively, and secured with conventional twist-on wire connectors 26 and 27, respectively. The ground lead 18 is secured to earth ground lead 28 via twist-on wire connector 29. A curved tube 30, threaded at one end, is attached to the back of the box 20 and secured with nut 31. A fiber optic signal line 32, which is installed in the building at the same time as the electrical wiring, passes through the tube 30 into electrical box 20. Subsequently, a fiber optic style connector 33, shown in cross section view, is installed onto the optical fiber line. The main body of the connector, through which the fiber passes, consists of a ferrule 34 at one end and a crimp section at the opposite end 35. A compression spring 36 and bayonet style connector 37 are slid over the connector body and retained by "C" ring 38. After crimping of the body onto the line, a rubber strain relief boot 39 is slid over the crimp area. At the ferrule end of the connector body, the optical fiber is cut off 4 and polished to provide a smooth interface with the mating fiber line when it is installed. The optical connector assembly is attached to the mating connector 19 on the back of the receptacle 12 by a push and twist of the bayonet barrel 37.

Figure 4:
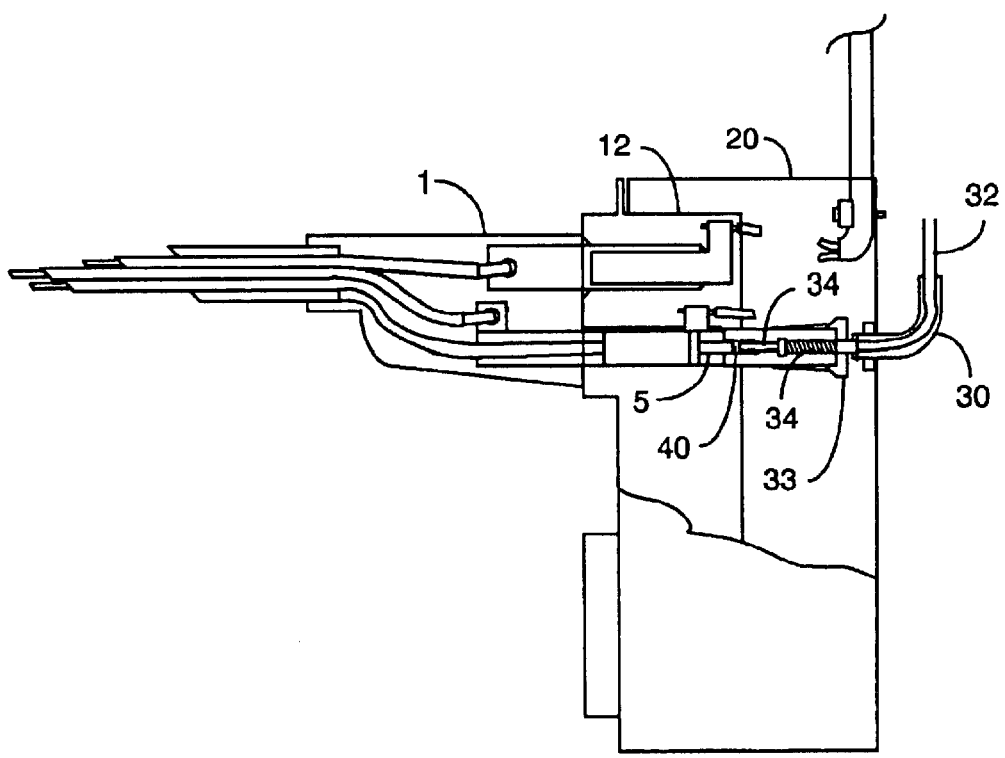
FIG. 4 is a side cutaway view of a preferred embodiment of the power plug when mated with the wall receptacle.

The installed receptacle 12 within the electrical box 20 and mating of the plug 1 with the receptacle are shown in partial sectional view in FIG. 4. After all connections have been made to the receptacle 12, as described above, the receptacle is pushed back into the electrical box 20 in conventional fashion and the receptacle is mounted to the box. The connected AG power and earth ground wires, which bend to conform to the space within the box, are not shown for ease of illustration in FIG. 4. The optical fiber line 32 is pushed back through its tube 30 in the back of the box. When the plug 1 is mated with the receptacle 12, power prongs and earth ground contacts mate in conventional fashion. At the same time the tip of the optical fiber 5 within the plug mates with the face of the optical fiber 40 within the receptacle. This mating causes the ferrule 34 to be pushed back so as to compress the spring 36 against connector 33. This spring force maintains the intimate contact between the ends of the optical fibers in the plug and receptacle required to provide optimum continuity in the fiber optic signal link between the plug and connector. Thus, when the power cord of a computer device is plugged into the wall socket, a connection to a fiber optic signal line is made simultaneously, and no separate signal line cord and set-up are required.

A variety of different plug, cord and receptacle configurations are possible as shown in FIGS. 5 through 10.

Figure 5A:
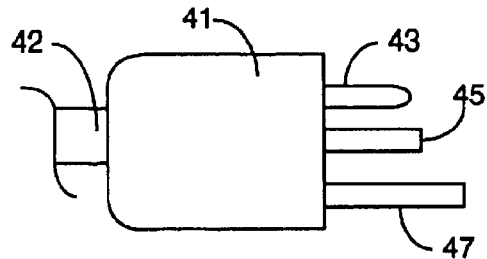
FIG. 5A is a side view of a preferred embodiment of a cord with a plug for AC power, earth ground and two signal leads (one fiber optic and one coax).
Figure 5B:
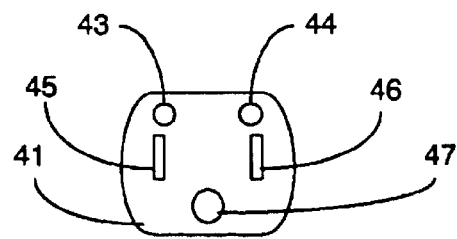
FIG. 5B is an end view of a preferred embodiment of a cord with a plug for AC power, earth ground and two signal leads (one fiber optic and one coax).
Figure 5C:
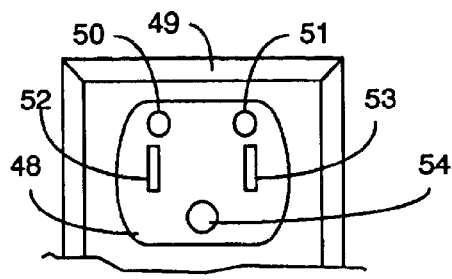
FIG. 5C is a front view of a preferred embodiment of a receptacle for AC power, earth ground and two signal leads (one fiber optic and one coax).
Figure 5D:
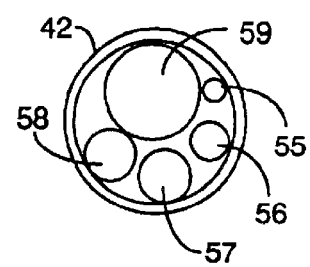
FIG. 5D is an end cutaway view of a preferred embodiment of a cord with AC power, earth ground and two signal leads (one fiber optic and one coax).

FIG. 5A shows a side view of plug 41 and a portion of cord 42. FIG. 5B shows an end view of the plug 41. FIG. 5C shows a front view of the corresponding receptacle 48 with face plate 49. FIG. 5D shows an enlarged sectional view of the power cord 42. This plug and receptacle are designed to provide simultaneous connections to a fiber optic signal, a co-axial cable signal, 120-volt AC power and earth ground. When the plug 41 is mated with the receptacle 48, post 43 of the plug interfaces with socket 51 of the receptacle to provide the fiber optics signal connection. Post 54 interfaces socket SO to provide the co-axial line connection. Blades 45 and 46 interface with sockets 53 and 52, respectively to provide the AG power connection. Contact 47 interfaces with socket 54 to provide the earth ground connection. In FIG. 5D, an enlarged cross-section of the cord shows fiber optics cable 55, earth ground lead 56, plus and minus AC power leads 57 and 58 and coax cable 59.

Figure 6A:
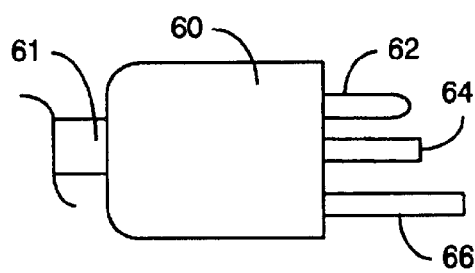
FIG. 6A is a side view of a preferred embodiment of a cord with a plug for AC power, earth ground and two fiber optic leads.
Figure 6B:
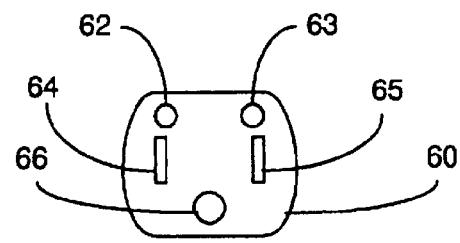
FIG. 6B is an end view of a preferred embodiment of a cord with a plug for AC power, earth ground and two fiber optic leads.
Figure 6C:
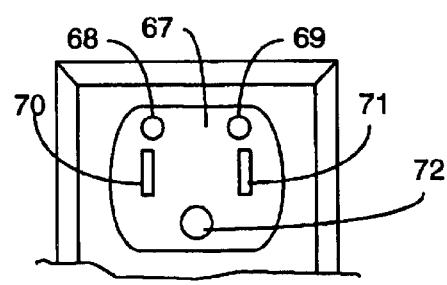
FIG. 6C is a front view of a preferred embodiment of a receptacle for AC power, earth ground and two fiber optic leads.
Figure 6D:
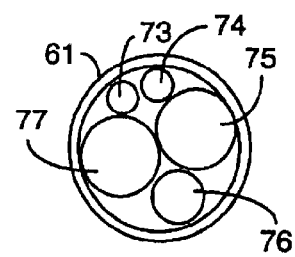
FIG. 6D is an end cutaway view of a preferred embodiment of a cord with AC power, earth ground and two fiber optic leads.

FIG. 6A shows a side view of plug 50 and a portion of cord 61. FIG. 6B shows an end view of the plug. FIG. 6C shows the corresponding front view of receptacle 67. FIG. 6D shows an enlarged sectional view of the power cord 61. This plug and receptacle combination are designed to provide simultaneous connections to two fiber optic signals, 120-volt AC power and earth ground. When the plug 60 is mated to the receptacle 67, posts 62 and 63 interface with sockets 69 and 68, respectively, to provide two fiber optics signal connections. Blades 64 and 65 interface with sockets 71 and 70, respectively, to provide the AC power connection. Contact 66 interfaces with socket 72 to provide the earth ground connection. In FIG. 6D, an enlarged cross-section of the cord shows the two fiber optics signal cables 73 and 74, AC power leads 75 and 77, and earth ground lead 76.

Figure 7A:
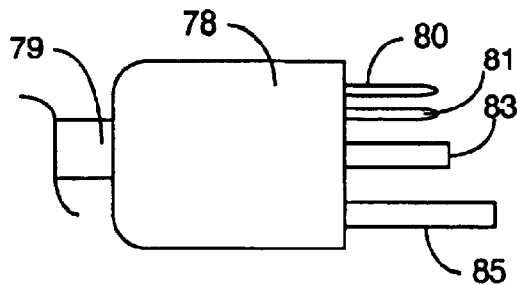
FIG. 7A is a side view of a preferred embodiment of a cord with a plug for AC power, earth ground and three signal leads (two fiber optic and one coax).
Figure 7B:
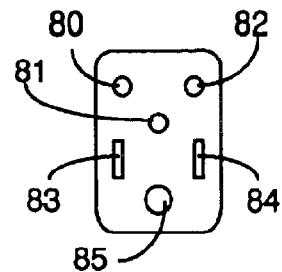
FIG. 7B is an end view of a preferred embodiment of a cord with a plug for AC power, earth ground and three signal leads (two fiber optic and one coax).
Figure 7C:
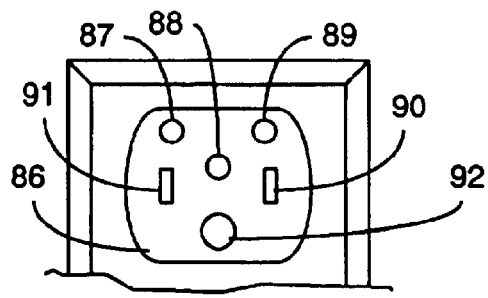
FIG. 7C is a front view of a preferred embodiment of a receptacle for AC power, earth ground and three signal leads (two fiber optic and one coax).
Figure 7D:
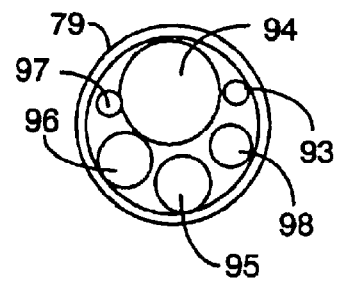
FIG. 7D is an end cutaway view of a preferred embodiment of a cord with AC power, earth ground and three signal leads (two fiber optic and one coax).

FIG. 7A shows a side view of plug 78 and portion of cord 79. FIG. 7B shows an end view of the plug. FIG. 7G shows the corresponding receptacle in front view 86. FIG. 7D shows an enlarged sectional view of the power cord 79. This plug and receptacle are designed to provide simultaneous connections to two fiber optics signal lines, one coax cable signal, 120-volt AC power and earth ground. When the plug 78 is mated to the receptacle 86, posts 80 and 82 interface with sockets 89 and 87, respectively, to provide two fiber optics signal connections. Post 81 interfaces with socket 88 to provide a coax cable connection. Blades 83 and 84 interface with sockets 91 and 90, respectively, to provide the AC power connection. Contact 85 interfaces with socket 92 to provide the earth ground connection. An enlarged cross-section of the cord, FIG. 7D, shows the two fiber optics cables 93 and 97, coax cable 94, AC power leads 95 and 96, and earth ground lead 98.

Figure 8A:
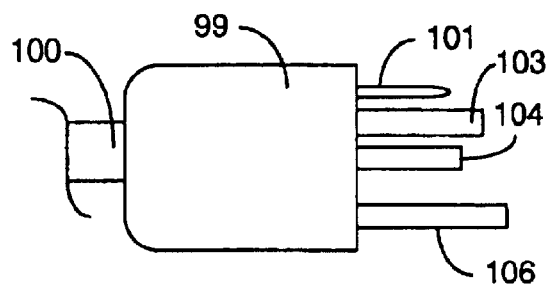
FIG. 8A is a side view of a preferred embodiment of a cord with a plug for AC power, earth ground, temperature controlled air line and two signal leads (One fiber optic and one coax).
Figure 8B:
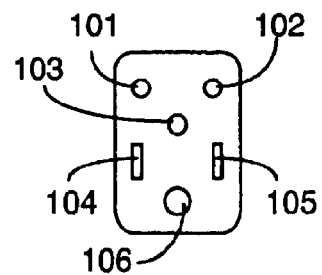
FIG. 8B is an end view of a preferred embodiment of a cord with a plug for AC power, earth ground, temperature controlled air line and two signal leads (One fiber optic and one coax).
Figure 8C:
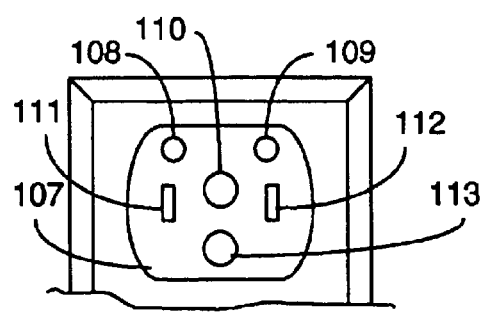
FIG. 8C is a front view of a preferred embodiment of a receptacle for AC power, earth ground, temperature controlled air line and two signal leads (One fiber optic and one coax).
Figure 8D:
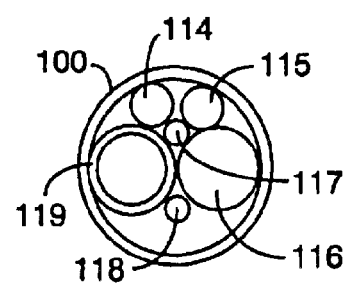
FIG. 8D is an end cutaway view of a preferred embodiment of a cord with AC power, earth ground, temperature controlled air line and two signal leads (One fiber optic and one coax).

FIG. 8A shows a side view of plug 99 and a portion of cord 100. FIG. 8B shows an end view of the plug. FIG. 8C shows a front view the corresponding receptacle 107. FIG. 8D shows an enlarged sectional view of the power cord 100. This plug and receptacle combination are designed to provide simultaneous connections to a fiber optics signal, a coax line, an air supply tube, 120-volt AC power and earth ground. Note: this type of receptacle would require an air shut-off device to prevent air from escaping when the air connection was not in use. It is assumed that this would be accomplished by a conventional type of pneumatic quick-disconnect and shut-off fitting, and is not a subject of this disclosure.

When the plug 99 is mated with receptacle 107, post 101 interfaces with socket 109 to provide the fiber optics connection. Post 102 interfaces with socket 108 to provide the coax signal connection. Pneumatic fitting 103 interfaces with tubing end 110 to provide the air supply connection. Blades 104 and 105 interface with sockets 110 and 111, respectively, to provide the AC power connection. Contact 106 interfaces with socket 113 to provide the earth ground connection. An enlarged cross-section of the cord 90, FIG. 8D, shows AC power leads 114 and 115, coax cable 116, fiber optics line 117, earth ground 118 and air supply tube 119.

Figure 9A:
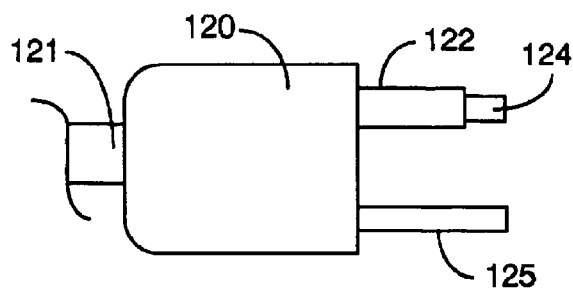
FIG. 9A is a side view of a preferred embodiment of a cord with a plug for AC power, earth ground and both temperature controlled air line.
Figure 9B:
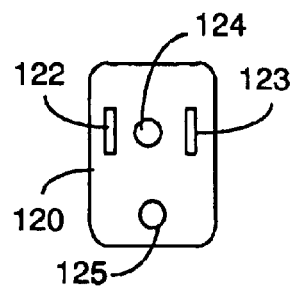
FIG. 9B is an end view of a preferred embodiment of a cord with a plug for AC power, earth ground and both temperature controlled air line.
Figure 9C:
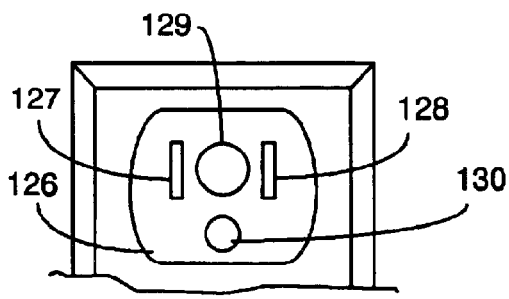
FIG. 9C is a front view of a preferred embodiment of a receptacle for AC power, earth ground and both temperature controlled air line.
Figure 9D:
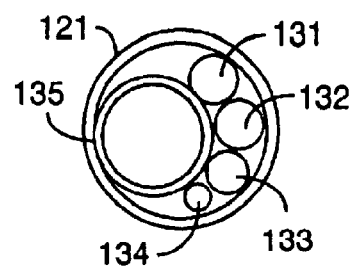
FIG. 9D is an end cutaway view of a preferred embodiment of a cord with AC power, earth ground and both temperature controlled air line.

FIG. 9A shows a side view of plug 120 and portion of cord 121. FIG. 9B shows an end view of the plug. FIG. 9G shows the corresponding front view of receptacle 126. FIG. 9D shows an enlarged sectional view of the power cord 121. This plug and receptacle combination are designed to provide simultaneous connections to a fiber optics signal, air supply, 120-volt AC power and earth ground. When the plug 120 is mated with the receptacle 126, blades 122 and 123 interface with sockets 128 and 127, respectively, to provide the AC power connection. Pneumatic fitting 124 interfaces with tubing end 129 to provide the connection to an air supply. Contact 125 interfaces with socket 130 to provide earth ground. An enlarged cross-section of the cord 121, FIG. 9D, shows the AC power leads 131 and 132, earth ground 133, fiber optics line 134 and air supply tube 135.

Figure 10A:
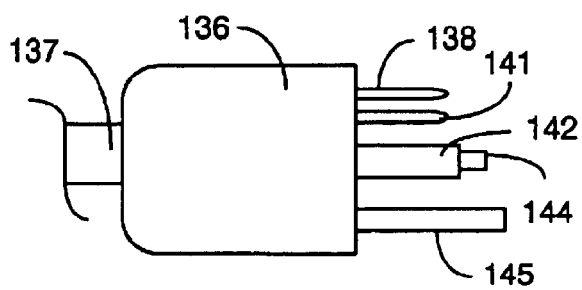
FIG. 10A is a side view of a preferred embodiment of a cord with a plug for AC power, earth ground and four signal leads (three fiber optic and one coax).
Figure 10B:
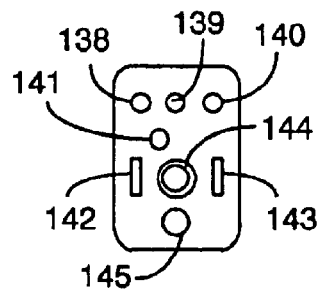
FIG. 10B is an end view of a preferred embodiment of a cord with a plug for AC power, earth ground and four signal leads (three fiber optic and one coax).
Figure 10C:
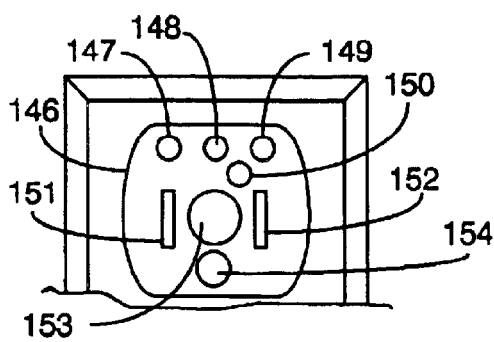
FIG. 10C is a front view of a preferred embodiment of a receptacle for AC power, earth ground and four signal leads (three fiber optic and one coax).
Figure 10D:
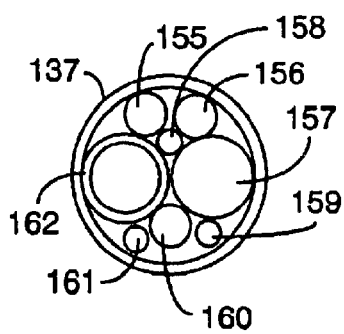
FIG. 10D is an end cutaway view of a preferred embodiment of a cord with AC power, earth ground and four signal leads (three fiber optic and one coax).

FIG. 10A shows a side view of plug 136 and portion of cord 137. FIG. 10B shows the plug in end view. FIG. 10G shows a front view of the corresponding receptacle 146. FIG. 10D shows an enlarged sectional view of the power cord 137. This plug and receptacle combination is designed to provide simultaneous connections to three fiber optics lines, one coax line, air supply, 120-volt AC power and earth ground. When plug 136 is mated with receptacle 146, posts 138, 139 and 140 interface with sockets 149, 148 and 147, respectively, to provide three separate fiber optics signal connections. Post 141 interfaces with socket 150 to provide a coax line connection. Blades 142 and 143 interface with sockets 152 and 151, respectively to provide the AC power connection. Fitting 144 interfaces with tubing end 153 to provide and air supply connection. Contact 145 interfaces with socket 154 to provide earth ground. An enlarged cross-section of the power cord 137, FIG. 10D, shows the fiber optics lines 158, 159 and 161; AC power leads 155 and 156; coax line 157; air supply tube 162 and earth ground 160.

Figure 11A:
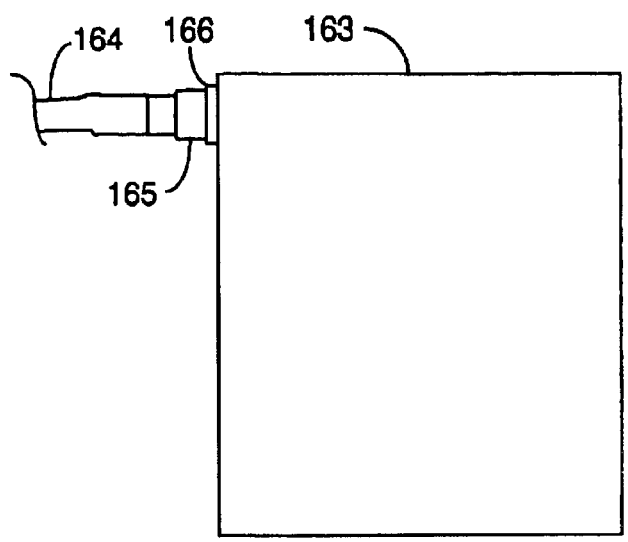
FIG. 11A is a side view of a preferred embodiment of a computer with a cable attached to a computer appliance coupler for AC power, earth ground, temperature controlled air and fiber optics signal installed in the rear of the computer.
Figure 11B:
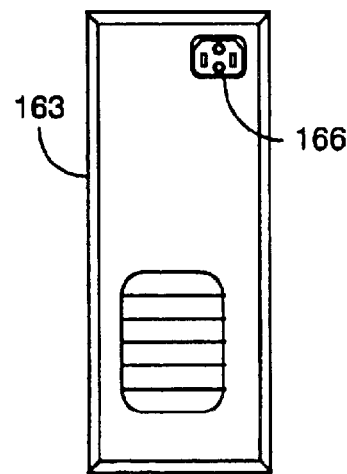
FIG. 11B is an end view of a preferred embodiment of a computer showing a computer appliance coupler for AC power, earth ground, temperature controlled air and fiber optics signal.
Figure 11C:
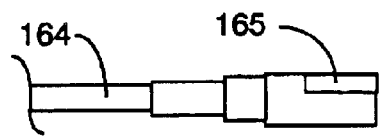
FIG. 11C is a side view of a preferred embodiment of a computer cable which attaches to a computer appliance coupler for AC power, earth ground, temperature controlled air and fiber optics signal.
Figure 11D:
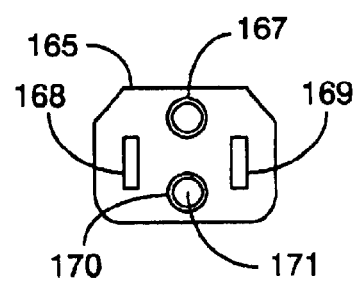
FIG. 11D is an end view of a preferred embodiment of a computer cable which attaches to a computer appliance coupler for AC power, earth ground, temperature controlled air and fiber optics signal.
Figure 11E:
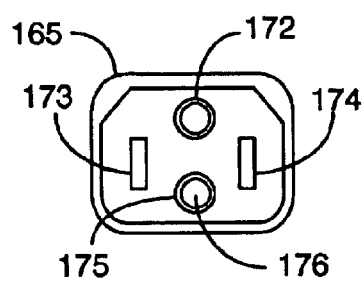
FIG. 11E is an end view of a preferred embodiment of a computer appliance coupler for receiving a computer cable which carries AC power, earth ground, temperature controlled air and fiber optics signal.
Figure 11F:
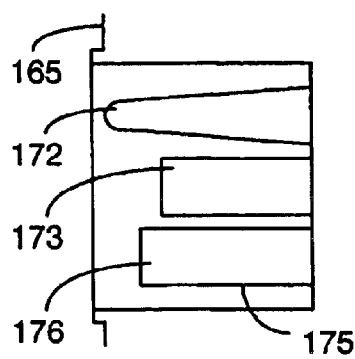
FIG. 11F is a side cutaway view of a preferred embodiment of a computer appliance coupler for receiving a computer cable which carries AC power, earth ground, temperature controlled air, and fiber optics signal.

In FIG. 11A, a side view of a typical small computer tower 163 is shown with an input cable 164 attached to its rear. Connector 165 (female) is attached to the end of the cable and mates with connector 166 (male) mounted to the back the computer. Connector 166 is shown in the rear view of the computer 163 in FIG. 11B without the cable attached. An enlarged view of the cable 164 and end 165 are shown in FIG. 11C. The end view of the cable connector is shown in FIG. 11D. An enlarged view of the connector on the back of the computer is shown in FIG. 11E. A cross-section through the computer connector is shown in FIG. 11F.

This cable 164 and appliance coupler 165/166 provide the computer 163 with 110-volt AC power, earth ground, forced temperature controlled air and fiber optics signal by means of a single interface to the computer. Referring to FIG. 11D, sockets 168 and 169 in the cable connector 165 mate with blades 174 and 173, respectively, in the computer connector 166, FIG. 11E, to provide AC power. Socket 170 mates with pin 175 to provide an earth ground connection. A fiber optic connector 171, which is mounted coaxially within the earth ground socket 170, mates with fiber optics connector 176, mounted co-axially within the earth ground pin 175 to provide a fiber optics signal connection. Air tube 167 engages with the air fitting 172 in the computer connector to supply an airflow to the computer for cooling. This eliminates the need for a separate fan within the computer enclosure for thermal management. In addition, the cooling air provided by this invention may also eliminate the need for a heat sink with the resulting decrease in cost, weight, and size which may be important in compact devices such as portable computers.

More types of appliance couplers for computers are disclosed herein and shown in FIGS. 12 through 14. FIG. 12A shows a side view of cable 177 with connector 178 attached. FIG. 12B shows the end view of the connector 178, while mating computer connector 181 is shown, in FIG. 12C. This coupler provides 110-volt AC power, earth ground, forced temperature controlled air and three fiber optics signals to the computer via one connection. Connections are identical to those described for FIGS. 11A–F, with two additional connections. Fiber optics connectors 179 and 180 mate with connectors 183 and 182, respectively, to bring the total of fiber optic signals provided to three.

FIG. 13A shows a side view of cable 184 with connector 185 attached. FIG. 13B shows the end view of the connector, while FIG. 13C shows the mating computer connector 188. This coupler provides 110-volt AC power, earth ground, forced temperature controlled air and a co-ax signal line to the computer. Power and temperature controlled air line connectors are identical to those described in FIGS. 12A–C. Socket 186 mates with pin 189 to provide the earth ground connection, while a coax connector 187 mounted co-axially within the ground socket 186 interfaces with the mating connector 190 mounted coaxially within ground pin 189 of the computer connector.

FIG. 14A shows side view of cable 191 with connector 192 attached. FIG. 14B shows the end view of the connector, while FIG. 14C shows the mating computer connector 195. This coupler provides for 110-volt AC power, earth ground, airflow, coax connection and two fiber optics signal connections. These connections are identical to those described in FIGS. 13A–C with the addition of the fiber optics signal lines. Connectors 193 and 194 mate with connectors 197 and 196 to provide the two fiber optic signal connections.

Appliance couplers for peripheral devices, such as printers, copiers, monitors and facsimile machines, are shown FIGS. 15–18. These couplers are virtually identical to those shown in FIGS. 11 through 14, with the exception that no airflow connection is provided. In the event that computer equipment, or other devices, do not require forced air for thermal management, then this connector structure is all that would be necessary.

Figure 15A:
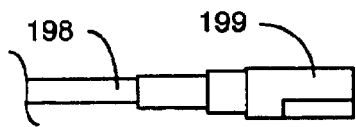
FIG. 15A is a side view of a preferred embodiment of a cable for an appliance coupler for a computer which carries AC power, earth ground, co-axial cable, and a fiber optics signal connection.
Figure 15B:
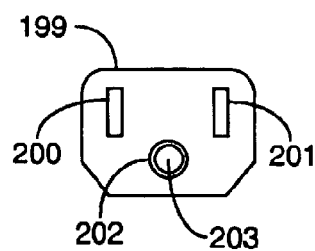
FIG. 15B is an end view of a preferred embodiment of a cable for an appliance coupler for a computer which carries AC power, earth ground, co-axial cable, and a fiber optics signal connection.
Figure 15C:
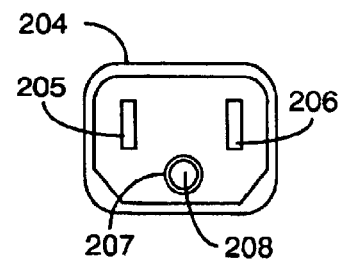
FIG. 15C is an end view of a preferred embodiment of an appliance coupler for use with a computer cable which carries AC power, earth ground, co-axial cable, and a fiber optics signal connection.

FIG. 15A shows a cable 198 with attached connector 199. FIG. 15B shows an end view of the connector, while FIG. 15C shows the mating equipment connector 204. Sockets 200 and 201 of the connector 199 mate with blades 206 and 205 respectively, connector 204 to provides the 110-volt AC connection, and socket 202 mates with pin 207 to provide earth ground connection. Connector 203, mounted co-axially inside of socket 202, mates with connector 208, mounted co-axially inside of pin 207, and provides a fiber optic signal connection.

Figure 16A:
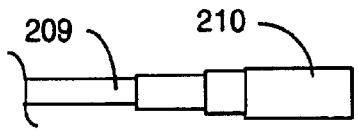
FIG. 16A is a side view of a preferred embodiment of a cable for an appliance coupler for a computer which carries AC power, earth ground, co-axial cable, and two additional fiber optics signal connections.
Figure 16B:
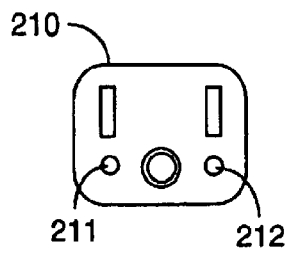
FIG. 16B is an end view of a preferred embodiment of a cable for an appliance coupler for a computer which carries AC power, earth ground, co-axial cable, and two additional fiber optics signal connections.
Figure 16C:
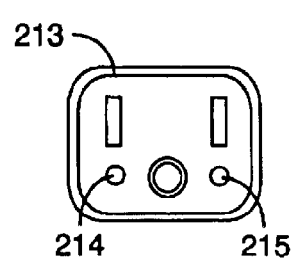
FIG. 16C is an end view of a preferred embodiment of an appliance coupler for use with a computer cable which carries AC power, earth ground, co-axial cable, and two additional fiber optics signal connections.

FIG. 16A shows a cable 209 with attached connector 210. FIG. 16B is an end view of the connector, while FIG. 16C shows the mating equipment connector 213. Connections are identical to those described in FIG. 15, with the exception that connectors 211 and 212 mate with connectors 215 and 214, respectively, to provide for two additional fiber optic signal connections.

Figure 17A:
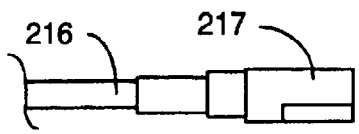
FIG. 17A is a side view of a preferred embodiment of a cable for an appliance coupler for a computer which carries AC power, earth ground, and a coax signal connection.
Figure 17B:
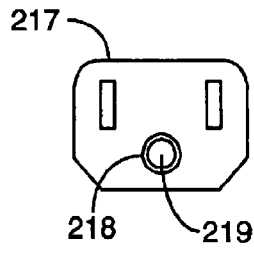
FIG. 17B is an end view of a preferred embodiment of a cable for an appliance coupler for a computer which carries AC power, earth ground, and a coax signal connection.
Figure 17C:
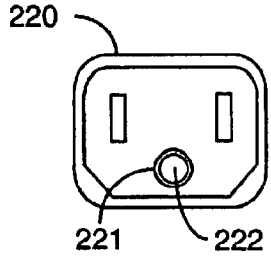
FIG. 17C is an end view of a preferred embodiment of an appliance coupler for use with a computer cable which carries AC power, earth ground, and a coax signal connection.

FIG. 17A shows a cable 216 with attached connector 217. FIG. 17B illustrates an end view identical to those described above. Socket 218 in connector 217 mates with pin 221 in connector 220 to provide the earth ground connection. In addition, a coax connector 219, mounted co-axially with socket 218, mates with coax connector 222, mounted co-axially with pin 221 to provide a for a coax signal connection. FIG. 17C illustrates the mating equipment connector 220.

Figure 18A:
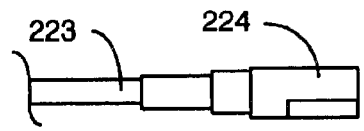
FIG. 18A is a side view of a preferred embodiment of a cable for an appliance coupler for a computer which carries AC power, earth ground, a coax signal connection, and two additional fiber optics signal connections.
Figure 18B:
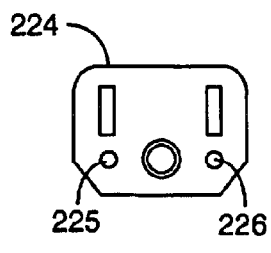
FIG. 18B is an end view of a preferred embodiment of a cable for an appliance coupler for a computer which carries AC power, earth ground, a coax signal connection, and two additional fiber optics signal connections.
Figure 18C:
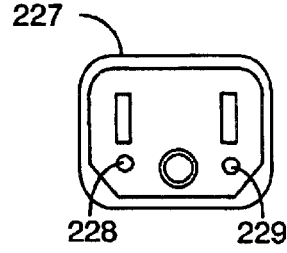
FIG. 18C is an end view of a preferred embodiment of an appliance coupler for use with a computer cable which carries AC power, earth ground, a coax signal connection, and two additional fiber optics signal connections.

FIG. 18A shows a cable 223 with attached connector 224. FIG. 18B shows an end view of the connector, while FIG. 18C shows the mating equipment connector 227. Connections are identical with those described in FIG. 17, with the exception that connectors 225 and 226 mate with connectors 229 and 228, respectively, to provide for two additional fiber optic signal connections.

Figure 19:
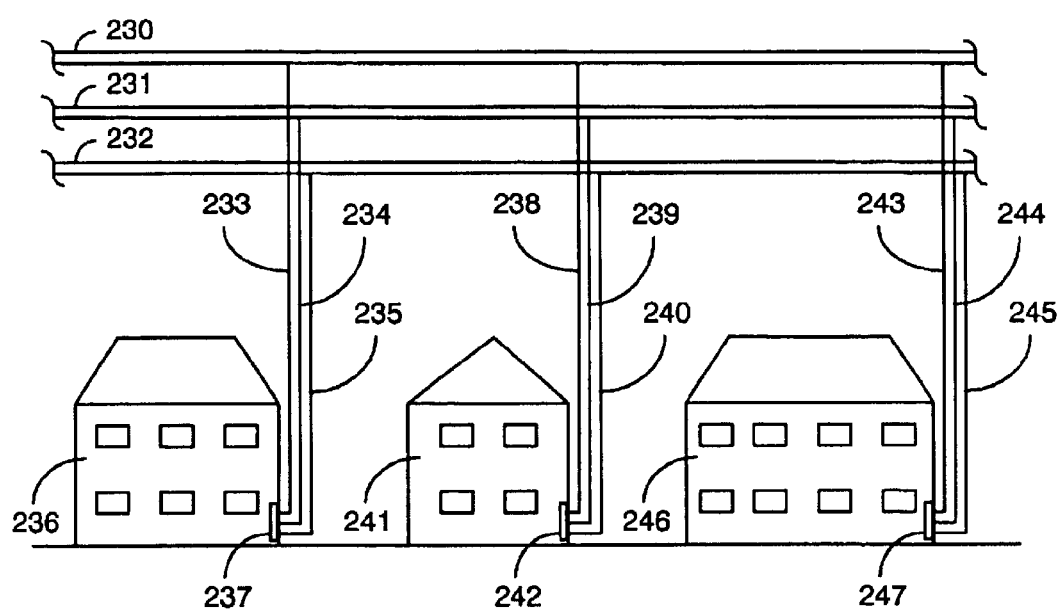
FIG. 19 illustrates a preferred embodiment of an external building wiring schematic diagram in which power, telephone, security device, and data lines interconnect several buildings.

FIG. 19 shows a diagram of typical networks as they are interconnected among various building premises 236, 241 and 246. Buildings are provided with power and signal lines by virtue of tapping into three established and available sources: (1) conventional AC power line 230 from municipal power company, (2) telephone/data line 231 from local telephone company and video/data line 232 from local cable company. Line taps 233, 234 and 235 are connected to building 236 to provide AC power, telephone and video cable connections (which may be useful for security applications, among others), respectively, via electrical distribution and router/switch box 237. Line taps 238, 239 and 240 are connected to building 241 to provide AC power, telephone and video cable connections, respectively, via electrical distribution and router/switch box 242. Line taps 243, 244 and 245 are connected to building 246 to provide AC power, telephone and video cable connections, respectively, via electrical distribution and router/switch box 247.

From electrical distribution and router/switch boxes 237, 242 and 247, AC power is distributed throughout buildings 236, 241 and 246, respectively, via conventional wiring methods. Similarly, telephone and data signal lines are distributed throughout buildings 236, 241 and 246 using fiber optic lines. Video/data signal lines are distributed throughout the buildings via coax cables. The various AC power, fiber optics and coax cable lines terminate in convenient outlet sockets mounted throughout each building. Sockets may be designed in a variety of ways, as disclosed in FIGS. 5 through 10, to provide AC power, telephone service and/or video signals to a variety of installed equipment such as, telephones, computers, copiers, printers, plotters, facsimile machines, television sets, security devices, lighting fixtures, etc. Outlets, such as those disclosed in FIGS. 8–10, would also be capable of providing connections to pressurized air from an on-premises air compressor for equipment, such as computers, which rely on forced convection for cooling.

Figure 20:
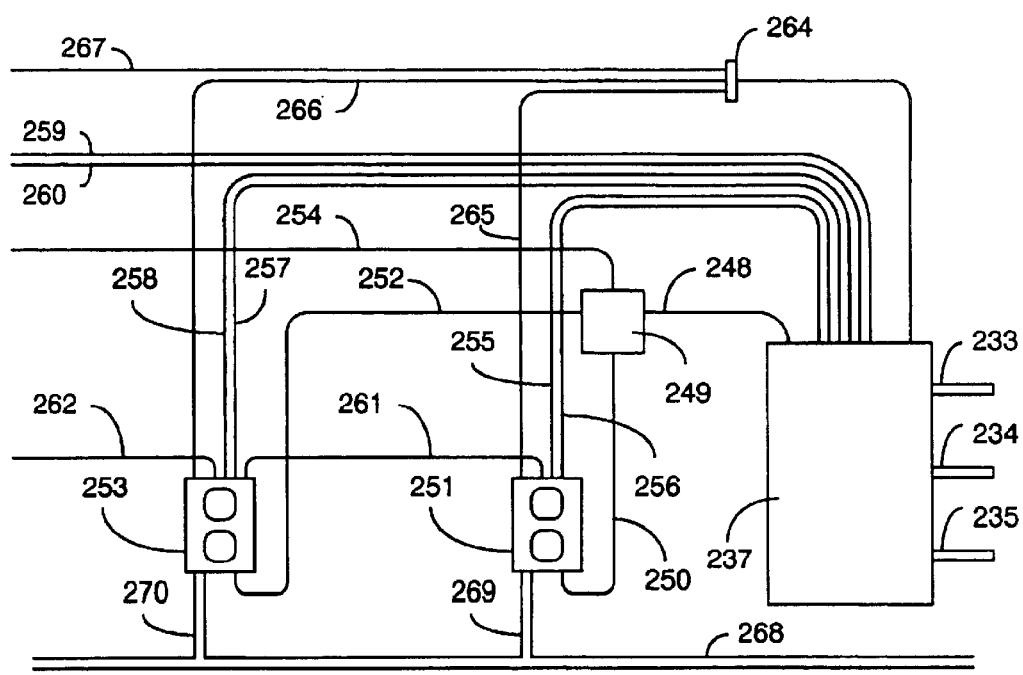
FIG. 20 is a preferred embodiment of an internal building network schematic which illustrates distribution of power, data, security device, and telephone lines within the building.

FIG. 20 illustrate how wall outlets, with integrated power, telephone/signal, video/signal and temperature controlled air lines, as disclosed herein, would be installed and utilized in an actual building installation. In this example, the building's electrical power connector. The AC power connections are distributed via router/switch panel 237, which is shown connected to external AC power line 233, telephone/data line 234 and video/data line 235 (Reference FIG. 19). Box 237 represents the circuit breaker panel which distributes AC power to individual circuits which are connected to the various electrical outlets throughout the building. Box 237 also embodies a router/switch which is designed to access and distribute several telephone lines via fiber optics throughout the building. The router/switch function in a similar manner to that of a PBX system in selecting different telephone lines. Additionally, box 237 provides for splitting of the incoming coax cable line into several branches for distribution to individual rooms and offices throughout the building.

One typical power circuit is represented by line 248 feeding from distribution panel 237 into junction box 249. From this box, power is distributed via line 250 to receptacle box 251, via line 252 to receptacle 253 and via line 254 to other parts of the building.

Fiber lines 255 and 256 connected between receptacle box 251 and panel 237 provide data signals to and from the receptacle. Similarly, lines 257 and 258 connected between receptacle box 253 and panel 237 provide data to and from this receptacle. Lines 259 and 260 represent signal lines to and from receptacles in other parts of the building. Lines 261 and 262 represent fiber optics signal lines connected between sockets for local area networking (LANs) within the building.

Line 263 represents one of several video/data coax signal distributed throughout the building. This line feeds into splitter 264 where the signal is split into three: line 265, feeding receptacle box 251; line 266, feeding receptacle box 253; and line 267, feeding a signal to another portion of the building.

In addition to the various electrical, power and signal lines described above, the building is also equipped with a means of supplying pressurized air to various receptacle boxes throughout the building for the purpose providing temperature controlled air to computers or other devices which require active cooling. The main air supply line 268 is connected by branch 269 to supply air on demand to receptacle box 251, and by branch 270 to supply air on demand to receptacle box 253. The main air line 268 continues on to provide air to other portions of the building.

Receptacle boxes configured in the manner shown in this schematic for boxes 251 and 253 provide for the versatility necessary to accommodate any one of the various types of sockets disclosed herein. The lines feeding into each one of the receptacle boxes which are actually utilized will depend on the type of socket being installed for each particular application within the building.

Figure 21:
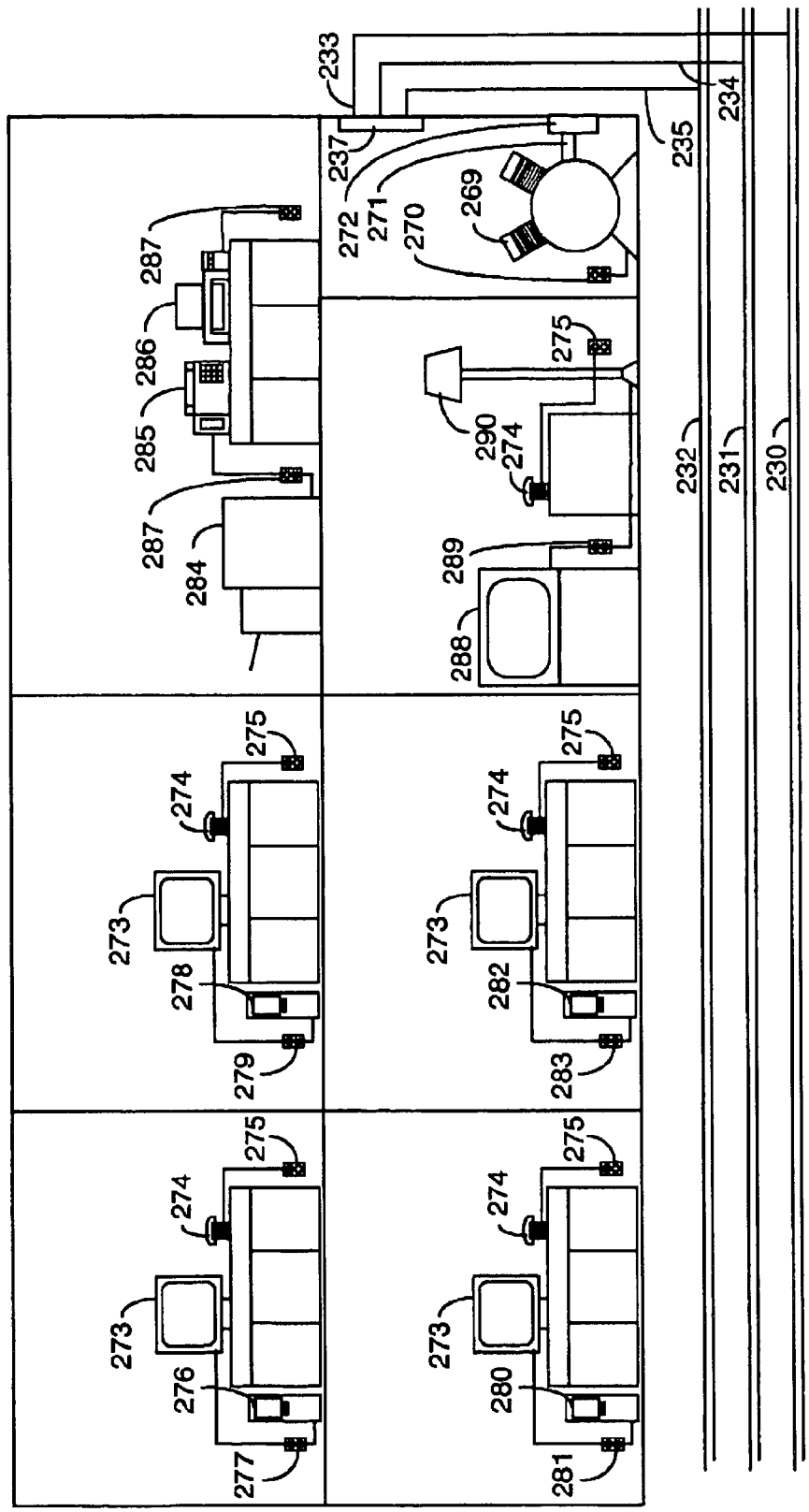
FIG. 21 is a preferred embodiment of a network schematic which illustrates the connection of multiple computers, telephones, televisions, security device, and a temperature controlled air system to the wiring system in a building.

FIG. 21 shows a schematic of a typical office building 236 with a variety of business equipment installed and plugged into the building network of AC power, telephone/data lines and fiber optics signal lines. Power line tap 233 from power station line 230, telephone tap 234 from telephone/data line 231 and coax line tap 235 from video/data cable 232 are all fed into electrical distribution and router/switch box 237 located in building maintenance room G.

Also located in the maintenance room G is an air compressor 269. This is supplied with electrical power from standard receptacle 270 and provides air pressure via line 271 to manifold 272. Air pressure is supplied from the manifold by air lines (not shown) throughout the building to outlets where it may be accessed by special plugs (as disclosed herein in regard to FIGS. 8–10) to provide cooling of heat generating equipment such as computers. This eliminates the need for cooling fans within computer enclosures.

Rooms A, B, C and D represent typical offices within the building 236. In office A, electrical outlet 277 represents the type of receptacle disclosed in this invention in FIG. 7. This outlet provides 120-volt AC to power the computer 276 and monitor 273. The outlet also connects the computer modem to the internet via one fiber optics signal line and to the building local area network (LAN) via a second fiber optics line. In addition, the outlet provides a coax cable signal, enabling the computer to receive video inputs from cable television. This office, as do rooms B, C, D and E, also contains a telephone 274 connected to a standard RJ 11 telephone jack 275.

In office B, electrical outlet 279 represents the type of receptacle disclosed in regard to FIG. 8. This outlet provides 120-volt AC to power the computer 278 and monitor 273. In addition, one fiber optics signal is provided to connect the computer to a telephone/data line for internet access or to the LAN. The outlet also provides a coax cable signal to enable the computer to receive video inputs, and finally, the outlet provides a source of air flow for computer thermal management.

In office C, electrical outlet 281 represents the type of receptacle disclosed in regard to FIG. 9. In addition to providing 120-volt AC to power the computer 280 and monitor 273, this outlet provides a source of air flow for cooling of the computer.

In office D, electrical outlet 283 represents the type of receptacle disclosed herein in FIG. 10. In addition to providing 120-volt AC to power the computer 282 and monitor 273, this outlet also provides for three fiber optics signal connections, one coax cable connection, as well as a source of air flow for cooling the computer. This outlet allows the computer to have separate fiber optics lines for data out and data in, as well as connection to the LAN. In addition it enables the computer to receive video input.

Equipment room E contains two outlets 287 which represent the type of receptacle disclosed herein in regard to FIG. 6. One receptacle provides power to the laser copier/printer 284 and to the facsimile (FAX) machine 285. This receptacle also provides for one fiber line to connect the copier/printer to the LAN and a second fiber optics line to connect the FAX machine to a telephone line. The second receptacle provides power to the color printer 286, and, in addition, one fiber optics line is used to connect the color printer to the LAN. In room F, electrical outlet 289 represents the type of receptacle disclosed in regard to FIG. 5. This outlet provides 120-volt power to the television set 288 and to the floor lamp 290. In addition, the outlet includes a coax connection to the TV set for cable hookup. This outlet also provides a fiber optics connection which could enable the TV with a modem to have web access.

One problem which becomes apparent when looking at FIG. 21 is the problem related to data collision when many different types of devices, and many different systems, share the same cabling system. In the preferred embodiment, the system avoids this problem by using a packet switching system in which each device moves data with accompanying identification information across the cable system in digital form. Packet switching is well-known in the art. Those skilled in the art will recognize that in addition to packet switching, any suitable alternative method of data collision avoidance can be used, such as time slicing, frequency assignment (e.g., allowing peripherals attached to a particular processor to have a dedicated frequency for communication with its respective processor), etc. In the packet switching situation, routers/switches may be used to control transfer of packets between peripherals and particular processor's. The routers/switches may even be programmed to poll devices on the system and control data transfer in a manner similar to that used by communication systems comprised of remote network nodes.

The invention taught herein provides a single cable between an electronic device and a wall receptacle which supplies power, provides multiple input/output data paths, and optionally provides a conduit for transferring temperature controlled air to the device, or extracting air from the device or even from the room. This eliminates cable clutter and allows individuals with no skill to attach devices to a system.

While the invention has been described with respect to a preferred embodiment thereof, it will be understood by those skilled in the art that various changes in detail may be made therein without departing from the spirit, scope, and teaching of the invention. For example, the material used to construct the connectors, receptacles, and cables may be anything suitable for their purpose, the size and shape of the connectors, receptacles, and cables can vary. The type and number of data lines can vary, etc. Accordingly, the invention herein disclosed is to be limited only as specified in the following claims.

I claim:

1. A multifunction power, data and/or cooling system, comprising:
   a power/data cable, further comprising:
      an internal power line with input contacts for inputting electrical power at a first end and output contacts for outputting electrical power at a second end; and
      an internal data line with means to input data at either end and output data at the opposing end;
   a wall receptacle, said wall receptacle further comprising:
      a power input for receiving electrical power;
      at least one data port for receiving/transmitting data; and
      a receptacle for attachment to the cower/data cable, the receptacle further comprising:
         output power contacts to output electrical power to the power/data cable; and
         a receptacle data input/output means to output data to the internal data line that was received at the data port, and to output data to the data port that was received from the internal data line;
   a temperature controlled air supply having an air output;
   a temperature controlled air supply line attached to the air output, and further attached to
   a temperature controlled air input on the wall receptacle;
   the wall receptacle further having a temperature controlled air output to output temperature controlled air received at its temperature controlled air input; and
   the power/data cable further comprising:
      a temperature controlled air input at one end of the power/data cable;
      a temperature controlled air output at the other end of the power/data cable; and
      a temperature controlled air conduit connecting the temperature controlled air input and the temperature controlled air output;
   whereby the power/data cable supplies power, data, and temperature controlled air.

2. A system, as in claim 1, wherein:
   the power/data cable further comprises multiple internal data lines; and
   the wall receptacle further comprises multiple receptacle data input/output means; whereby multiple data paths are provided by the power/data cable.

3. A system, as in claim 2, wherein the data transferred on the internal data lines is computer data, and/or facsimile data, security data, and/or voice telephone data, and/or video data;
   whereby multiple types of data are transferred on the internal data lines.

4. A multifunction power, data and/or cooling system, comprising:
   a power/data cable, further comprising:
      an internal power line with input contacts for inputting electrical power at a first end and output contacts for outputting electrical power at a second end; and
      a plurality of internal data line with means to input data at either end and output data at the opposing end, and the data transferred on the internal data lines is computer data, and/or facsimile data, security data, and/or voice telephone data, and/or video data;
   a wall receptacle, said wall receptacle further comprising:
      a power input for receiving electrical power;
      at least one data port for receiving/transmitting data; and
      a receptacle for attachment to the power/data cable, the receptacle further comprising:
         output power contacts to output electrical power to the power/data cable; and
         a plurality of receptacle data input/output means to output data to the internal data line that was received at the data port, and to output data to the data port that was received from the internal data line;
   a power/data router/switch, the power/data router/switch further comprising:
      a router/switch power input for receiving external power;
      a router/switch telephone data input/output for communicating with an external telephone network;
      a router/switch power output;
      a router/switch data output;
      a router/switch data input; and
      means to control data traffic between wall receptacles by routing data through the power/data router/switch;
   a router/switch power line electrically attaching the router/switch power output to the power inputs of the wall receptacle; and
   a router/switch data line attaching the wall receptacle to the router/switch data output and/or the router/switch data input;

whereby a single power/data cable is used to transfer both electrical power and multiple types of data, and the router/switch supplies power to the wall receptacles and controls data traffic to and from the wall receptacles.

5. A multifunction power, data and/or cooling system comprising:
a power/data cable, further comprising:
an internal power line with input contacts for inputting electrical power at a first end and output contacts for outputting electrical power at a second end; and
a plurality of internal data lines with means to input data at either end and output data at the opposing end, and/or facsimile data, security data, and/or voice telephone data, and/or video data;
a wall receptacle, said wall receptacle further comprising:
a power input for receiving electrical power;
at least one data port for receiving/transmitting data; and
a receptacle for attachment to the power/data cable, the receptacle further comprising:
output power contacts to output electrical power to the power/data cable; and
a plurality of receptacle data input/output means to output data to the internal data line that was received at the data port, and to output data to the data port that was received from the internal data line;
a temperature controlled air supply having an air output;
a temperature controlled air supply line attached to the air output, and further attached to
a temperature controlled air input on the wall receptacle;
the wall receptacle further having a temperature controlled air output to output temperature controlled air received at its cool air input; and
the power/data cable further comprising:
a temperature controlled air input at one end of the power/data cable;
a temperature controlled air output at the other end of the power/data cable; and
a temperature controlled air conduit connecting the temperature controlled air input and the cool air output;
whereby the power/data cable supplies power, data, and temperature controlled air.

6. A system, as in claim 5, further comprising:
a power/data router/switch, the power/data router/switch further comprising:
a router/switch power input for receiving external power;
a router/switch telephone data input/output for communicating with an external telephone network;
a router/switch power output;
a router/switch data output;
a router/switch data input; and
means to control data traffic between wall receptacles by routing data through the power/data router/switch;
a router/switch power line electrically attaching the router/switch power output to the power inputs of the wall receptacle; and
a router/switch data line attaching the wall receptacle to the router/switch data output and/or the router/switch data input;
whereby the router/switch supplies power to the wall receptacles and controls data traffic to and from the wall receptacles.

7. A multifunction power, data and/or cooling system, comprising:
a power/data cable, further comprising:
an internal power line with input contacts for inputting electrical power at a first end and output contacts for outputting electrical power at a second end; and
an internal data line with means to input data at either end and output data at the opposing end;
a wall receptacle, said wall receptacle further comprising:
a power input for receiving electrical power;
at least one data port for receiving/transmitting data; and
a receptacle for attachment to the power/data cable, the receptacle further comprising:
output cower contacts to output electrical power to the power/data cable; and
a receptacle data input/output means to output data to the internal data line that was received at the data port, and to output data to the data port that was received from the internal data line;
the wall receptacle further comprises a ground lug aperture for receiving a ground lug on the power/data cable;
the power/data cable further comprises a ground lug, the ground lug having a central conduit;
the internal data line is inserted through the central conduit;
the wall receptacle further having means to receive data output from the internal data line, and means to input data into the input data line.

8. A system, as in claim 7, wherein the wall receptacle further comprises:
two parallel apertures for accepting power cord voltage prongs, the parallel voltage prongs aligned with the ground lug such that either a power/data cable or a conventional power plug can be inserted in the wall receptacle;
whereby the wall receptacle connects to the power/data cable or to a conventional power plug.

9. A system, as in claim 7, wherein:
the power/data cable further comprises multiple internal data lines; and
the wall receptacle further comprises multiple receptacle data input/output means;
whereby multiple data paths are provided by the power/data cable.

10. A system, as in claim 9, wherein the data transferred on the internal data lines is computer data, and/or facsimile data, security data, and/or voice telephone data, and/or video data;
whereby multiple types of data are transferred on the internal data lines.

11. A system, as in claim 10, further comprising:
a power/data router/switch, the power/data router/switch further comprising:
a router/switch power input for receiving external power;
a router/switch telephone data input/output for communicating with an external telephone network;
a router/switch power output;
a router/switch data output;
a router/switch data input; and
means to control data traffic between wall receptacles by routing data through the power/data router/switch;
a router/switch power line electrically attaching the router/switch power output to the power inputs of the wall receptacle; and a router/switch data line attaching the wall receptacle to the router/switch data output and/or the router/switch data input;

whereby the router/switch supplies power to the wall receptacles and controls data traffic to and from the wall receptacles.

12. A system, as in claim 11, further comprising:

a temperature controlled air supply having an air output;

a temperature controlled air supply line attached to the air output, and further attached to a temperature controlled air input on the wall receptacle;

the wall receptacle further having a temperature controlled air output to output cool air received at its temperature controlled air input; and the power/data cable further comprising:
- a temperature controlled air input at one end of the power/data cable;
- a temperature controlled air output at the other end of the power/data cable; and
- a temperature controlled air conduit connecting the temperature controlled air input and the temperature controlled air output;

whereby the power/data cable supplies power, data, and temperature controlled air.

13. A system, as in claim 10, wherein the wall receptacle further comprises:

two parallel apertures for accepting power cord voltage prongs, the parallel voltage prongs aligned with the ground lug such that either a power/data cable or a conventional power plug can be inserted in the wall receptacle;

whereby the wall receptacle connects to the power/data cable or to a conventional power plug.

14. A system, as in claim 9, further comprising:

a temperature controlled air supply having an air output;

a temperature controlled air supply line attached to the air output, and further attached to a temperature controlled air input on the wall receptacle;

the wall receptacle further having a temperature controlled air output to output temperature controlled air received at its temperature controlled air input; and the power/data cable further comprising:
- a temperature controlled air input at one end of the power/data cable;
- a temperature controlled air output at the other end of the power/data cable; and
- a temperature controlled air conduit connecting the temperature controlled air input and the temperature controlled air output;

whereby the power/data cable supplies power, data, and cool air.

15. A system, as in claim 14, further comprising:

a power/data router/switch, the power/data router/switch further comprising:
- a router/switch power input for receiving external power;
- a router/switch telephone data input/output for communicating with an external telephone network;
- a router/switch power output;
- a router/switch data output;
- a router/switch data input; and
- means to control data traffic between wall receptacles by routing data through the power/data router/switch;

a router/switch power line electrically attaching the router/switch power output to the power inputs of the wall receptacle; and a router/switch data line attaching the wall receptacle to the router/switch data output and/or the router/switch data input;

whereby the router/switch supplies power to the wall receptacles and controls data traffic to and from the wall receptacles.

16. A system, as in claim 14, wherein the wall receptacle further comprises:

two parallel apertures for accepting power cord voltage prongs, the parallel voltage prongs aligned with the ground lug such that either a power/data cable or a conventional power plug can be inserted in the wall receptacle;

whereby the wall receptacle connects to the power/data cable or to a conventional power plug.

17. A method, of supplying power, data and/or cooling with a single cable, including the steps of:

using a wall receptacle which has input/output ports for power and data;

using a multifunction power/data cable to carry power between a wall receptacle and an electronic device via internal power lines which carry power from the wall receptacle to the electronic device; and using the multifunction power/data cable to carry data between the wall receptacle and the electronic device via internal data lines which carry data between the wall receptacle and the electronic device;

supplying temperature controlled air to the wall receptacle;

transferring the temperature controlled air from the wall receptacle to the power/data cable; and inputting temperature controlled air from the power/data cable to the electronic device;

whereby the electronic device receives power and temperature controlled air from the wall receptacle using a power/data cable, and transmits data between the electronic device and the wall receptacle via the power/data cable.

18. A method of supplying power, data and/or cooling with a single cable, including the steps of:

using a wall receptacle which has input/output ports for power and data;

using a multifunction power/data cable to carry power between a wall receptacle and an electronic device via internal power lines which carry power from the wall receptacle to the electronic device; and using the multifunction power/data cable to carry data between the wall receptacle and the electronic device via internal data lines which carry data between the wall receptacle and the electronic device;

forming the wall receptacle such that it provides apertures for conventional voltage blades and an aperture for a ground lug, such that a conventional power plug can be operably connected to the wall receptacle;

locating the internal data line inside a conduit in the ground lug; and providing means in the wall receptacle to transfer data between the wall receptacle and the internal data line;

whereby the wall receptacle can be attached to either a conventional power plug or a power/data cable.

19. A method of supplying power, data and/or cooling with a single cable, including the steps of:

using a wall receptacle which has input/output ports for power and data;

using a multifunction power/data cable to carry power between a wall receptacle and an electronic device via internal power lines which carry power from the wall receptacle to the electronic device; and using the multifunction power/data cable to carry data between the wall receptacle and the electronic device via internal data lines which carry data between the wall receptacle and the electronic device;

using an air conduit in the power/data cable to provide a path for extracting air from the power/data cable to the wall receptacle; and pulling ambient air into an electronic device by extracting air from the electronic device by pumping air from the power/data cable through the wall receptacle;

whereby the electronic device is cooled by extracting air from it through the wall receptacle, and pulling cooler ambient air into the electronic device.

20. A method of supplying power, data and/or cooling with a single cable, including the additional steps of:

using a wall receptacle which has input/output ports for power and data;

using a multifunction power/data cable to carry power between a wall receptacle and an electronic device via internal power lines which carry power from the wall receptacle to the electronic device; and using the multifunction power/data cable to carry data between the wall receptacle and the electronic device via internal data lines which carry data between the wall receptacle and the electronic device;

using an air conduit in the power/data cable to provide a path for extracting air from the power/data cable to the wall receptacle;

pulling ambient air into the power/data cable by pumping air from the power/data cable through the wall receptacle; and remotely monitoring the air extracted from the power/data cable; whereby the ambient air can be remotely monitored.

21. A multifunction plug receptacle for use with a power/data cable having an internal power line and an internal data line, further comprising:

a power input having voltage lines and a ground lug with a central conduit; and at least one data input, the data input located such that it receives and transmits data via a data path in the central conduit in the ground lug.

22. A multifunction plug receptacle, as in claim 21, further comprising an air input aperture.

* * * * *